E. P. COLLINS.
ELEVATOR.
APPLICATION FILED JAN. 17, 1919.
1,371,354.
Patented Mar. 15, 1921.
2 SHEETS—SHEET 1.
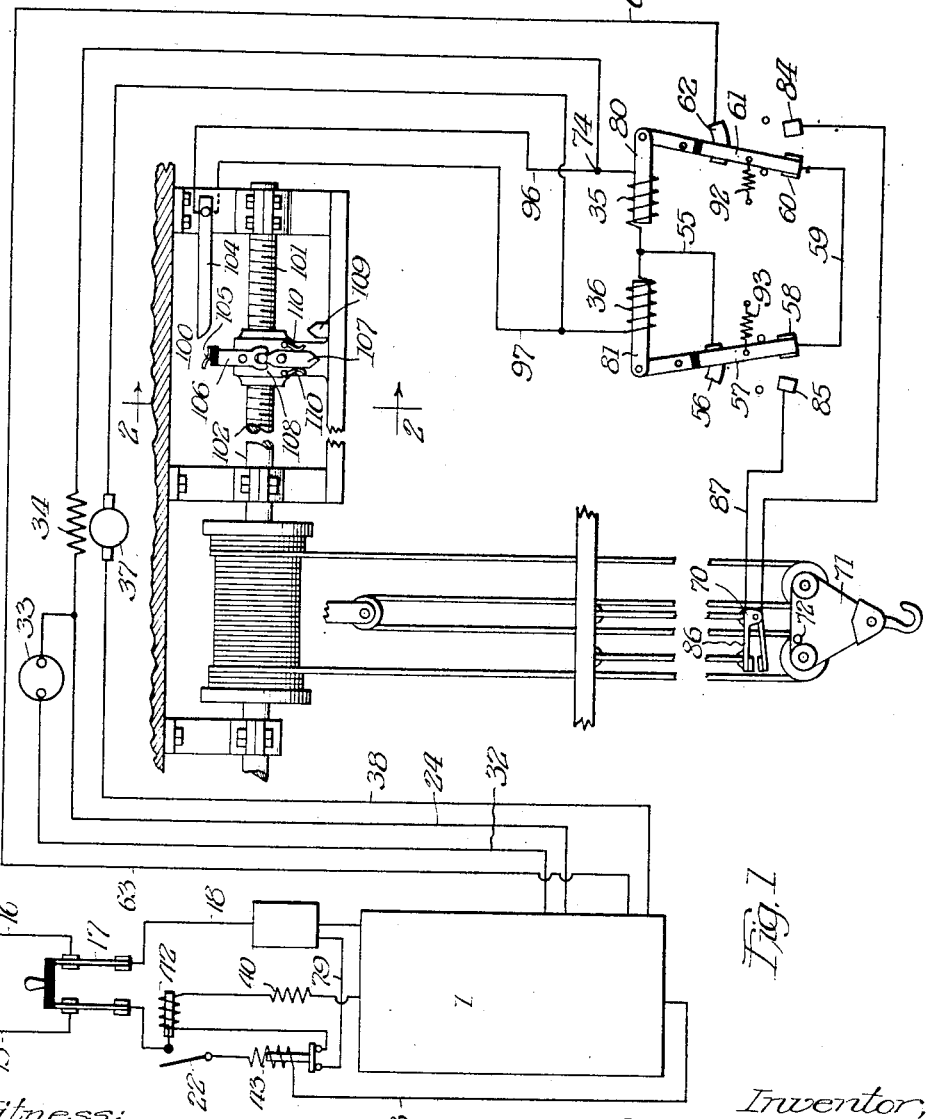
Witness:
L. W. Novander
Inventor:
Edward P. Collins
By E. J. Andrews
Atty.

E. P. COLLINS.
ELEVATOR.
APPLICATION FILED JAN. 17, 1919.
1,371,354.
Patented Mar. 15, 1921.
2 SHEETS—SHEET 2.
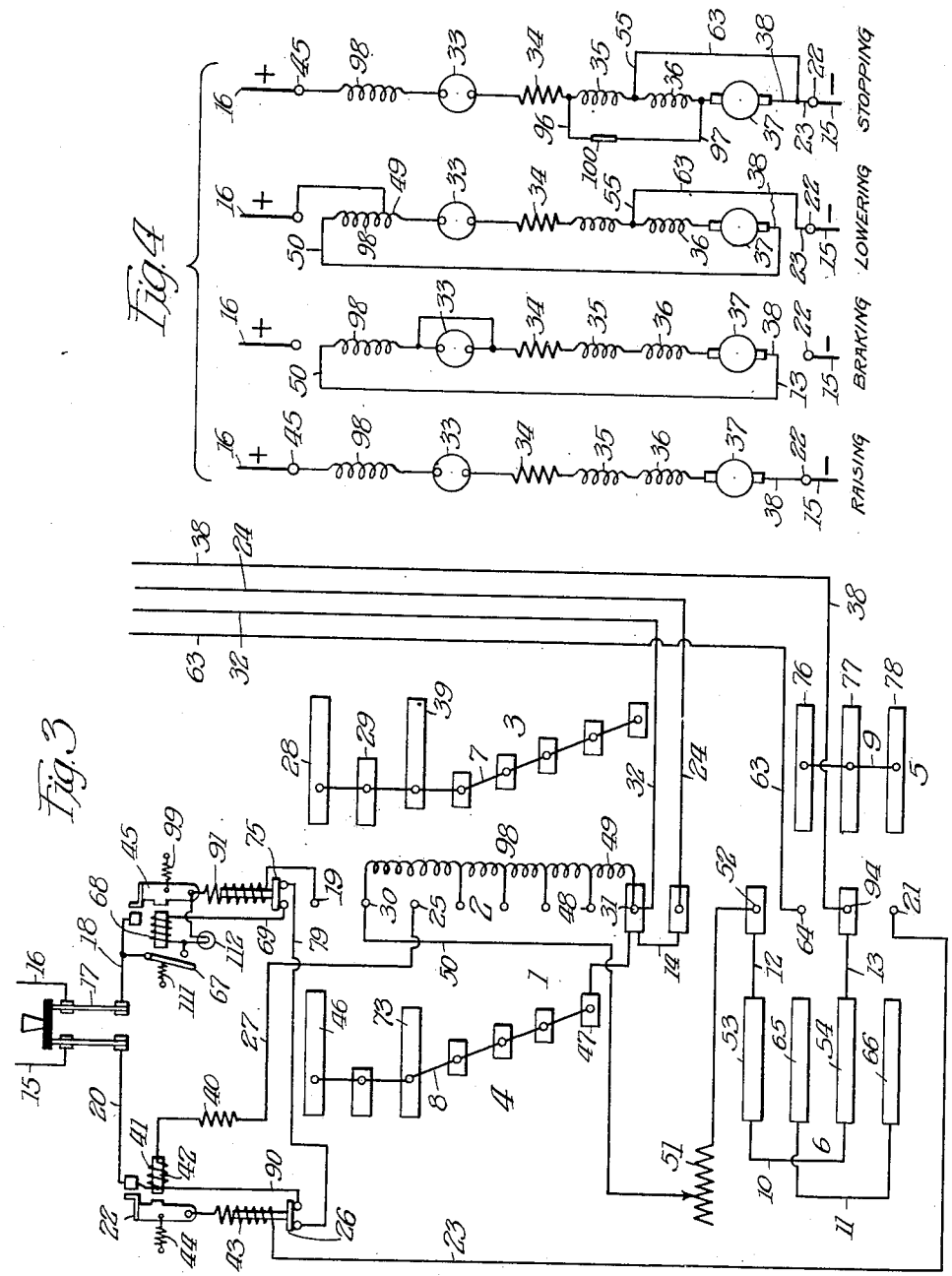

UNITED STATES PATENT OFFICE.

EDWARD P. COLLINS, OF CHICAGO, ILLINOIS.

ELEVATOR.

1,371,354.     Specification of Letters Patent.     Patented Mar. 15, 1921.

Original application filed March 19, 1917, Serial No. 155,646. Divided and this application filed January 17, 1919. Serial No. 271,601.

*To all whom it may concern:*

Be it known that I, EDWARD P. COLLINS, a citizen of the United States, residing at Chicago, in the county of Cook and State of Illinois, have invented certain new and useful Improvements in Elevators, of which the following is a specification.

This invention relates to elevators, and more particularly to electric elevators which are used for cranes for hoisting various material and machinery. It has for its object the production of an improved limit switch to be used with such cranes or other similar apparatus, and it is a division of Patent No. 1,311,262, issued to me on July 29, 1919.

Of the accompanying drawings Figure 1 is an elevation, more or less diagrammatic of an electric elevating system comprising limit-switch means, which embody features of my invention. Fig. 2 is a section along the line 2—2 of Fig. 1. Fig. 3 is a detail diagrammatic view of the motor controller of the system; and Fig. 4 illustrates the various electric working circuits of the system.

I use in this instance a cylindrical form of motor controller 1, the cylinder being adapted to be rotated a limited distance in either direction from the neutral position, and having fingers 2 fixed to the frame of the controller and extending over the cylinder so as to come in contact with the contact plates 3, 4, 5, and 6, fixed to the surface of the cylinder; and thus to produce the desired changes in wire connections, various wires of the electric circuits being permanently connected with the fingers.

Various contact plates are electrically connected with each other in any suitable manner. For convenience I have in this instance indicated diagrammatically the connections by the lines 7 to 14 inclusive. Thus all of the plates 3 are connected, also all of plates 4, and all of plates 5; while plates 6 are connected in pairs.

The supply mains 15 and 16 of the system are connected to the main switch 17. From this switch, wire 18 is connected with finger 19 through a switch 45, hereinafter described; while wire 20 is connected with a finger 21 through a switch 22 and wire 23. Wire 20 is also connected with finger 25 through coils 41 and 40 and wire 27.

In starting the motor, a switch 67 is closed and this closes a relay circuit through coil 68, wire 69, overload switch 75, wire 79, overload switch 26, wire 90, and wire 20 to the main switch. This circuit energizes coil 68 which closes switch 45. Then, as the controller plates 3 are turned toward the fingers 2, plates 28 and 29 come in contact respectively with fingers 19 and 30, and a circuit is formed from the wire 16, through wire 18, switch 45, coil 91, plate 28, plate 29, finger 30, resistances 98, finger 31, wire 32, brake coil 33, field coil 34, the low resistance coils 35 and 36 hereinafter described, armature coils 37, wire 38, finger 94, plates 5, finger 21, wire 23, and, as soon as the switch 22 is closed, the circuit will be complete, forming a series connected motor system. But at the same time the armature is shortened by the following circuit: from coil 35 to plate 56, brush 57, plate 58, wire 59, plate 60, brush 61, plate 62, wire 63, finger 64, plate 76, wire 9, plate 78, and finger 21.

The switch 22 is adapted to eliminate the heavy sparking current from the controller contacts. This switch remains open until plate 39 comes in contact with finger 25. Current then flows from the supply wire 16, through finger 19, plates 28 and 39, finger 25, wire 27, resistance coil 40, electromagnet coil 41, and wire 20 to the supply wire 15. This causes the electromagnet 42 to close the switch 22, and thus to close both of the above described circuits.

In case of an overload, at any time, coil 43 opens the switch 26, or coil 91 opens the switch 75, breaking the circuit through coil 68, and releasing switch 45 which is forced open by the spring 99. Switch 67 is normally forced open by the spring 111, the current through coil 68 and the lamp 112 being sufficient to hold switch 45 closed after it has been closed by manually closing switch 67 and shorting the lamp.

Coil 36 is also shorted by the above specified circuit through wires 59 and 63. Hence this coil receives substantially no current; but coil 35 is fully energized, and core 80 is pulled thereby inwardly and brush 61 passes from plate 60 to plate 84, thus opening the circuit through wire 63 which shorted coil 36 and the armature. Then coil 36 becomes fully energized and core 81 is pulled inwardly and brush 57 changes from plate 58 to plate 85. The shifting of the brushes 61 and 57 in the above described manner connects the safety switch 70 with the source of electric supply for purposes hereinafter described.

By shorting coil 36 and the armature coils, as stated, the brake coil 33 receives sufficient current to fully overcome the inertia and any sticking of the parts, and to thus fully release the brake. After the shorting circuit is opened by the energized coil 35 shifting brush 61, the brake coil receives less current but sufficient to keep the brake band released. By this means I am able to reduce the amount of current used by the brake coil and still have ample to fully release the brake.

As the controller cylinder is rotated farther, the resistances 98 are gradually cut out by the respective plates 3 coming in contact with the fingers 2, until finally substantially the full line electromotive force is effective through the motor, as indicated by the "raising" circuit of Fig. 4.

The motor is brought to rest by throwing the controller to the neutral position indicated by Fig. 3. This disconnects the supply lines, and coils 35 and 36, being deenergized, the respective springs 92 and 93 force the brushes 61 and 57 to plates 60 and 58. The carrier is then lowered by reversing the motor and at the same time connecting it as a shunt motor. This is accomplished by bringing plates 4 into operation. As plate 46 touches finger 19 a circuit is formed through wire 8, plate 47, finger 48, resistance coil 49, finger 31, wire 32, to the brake and the field coils 33 and 34, and to coil 35. Also from finger 48 through the remainder of the resistances 98, finger 30, wire 50, the adjustable resistances 51, finger 52, plate 53, wire 10, plate 54, finger 94, wire 38, armature coils 37, to coil 36. Hence the field and armature coils are in parallel. From coils 35 and 36, where the field and armature circuits join, the current is free to flow through wire 55, plate 56, brush 57, plate 58, wire 59, plate 60, brush 61, plate 62, wire 63, finger 64, plate 65, wire 11, plate 66, finger 21, wire 23, and, when the switch 22 is closed, through the switch, wire 20 and switch 17 to the supply. Switch 22 is closed as before as soon as plate 73 touches finger 25. See the "lowering" circuit, Fig. 4. As the controller cylinder is rotated further the resistances 98 are gradually cut out of the armature circuit and into the field circuit by the plates 4 coming successively in contact with the fingers 2.

If, now, it is desired to stop the motor with the carrier and its load suspended, the controller is thrown back into neutral position, thus cutting off the supply current. Simultaneously with the cutting off of the supply current, a dynamic-brake circuit is closed through the armature and the controller, as follows: from the armature coils 37, through wire 38, to finger 94, plates 54 and 53, finger 52, coil 51, finger 30, resistances 98, finger 31, wires 14 and 24, field coil 34, coils 35 and 36 to the armature; thus shorting the electrically operated mechanical brake coil and thus applying the mechanical brake and allowing the load to come to rest under the retarding action of the mechanical brake and also of the dynamic brake formed by the closed circuit through the armature. See the "braking" circuit, Fig. 4.

It is customary with elevators, cranes and other hoisting mechanism to have limit switches, and especially switches limiting the height to which the carrier can be raised. Switches for this purpose may be normally closed or open. I prefer for the purposes of illustrating my invention to use a normally open switch, which, when the height limit is reached, is closed by the carrier or otherwise, and thus stops the motor. In this instance I arrange the system so that when the switch is closed the motor armature coils are shorted and hence the motor is brought to rest.

Referring to Fig. 1, when elevating, the armature 37, by means of the controller 1, is connected in series with the field coil 34 of the motor, in the manner hereinabove described. Switches 57 and 61 are then held, by the coils 36 and 35, respectively in contact with plates 84 and 85, as the coils are arranged so as to cause the adjacent ends of the cores 80 and 81 to have unlike polarity and hence to attract each other. The outer ends of the coils 36 and 35 are connected, by means of the wires 97 and 96, respectively, with the arms 103 and 104 of the limit switch 100. This switch is arranged to be operated by means of the screw 101, which is operatively connected to the drum shaft 102, or is operated in any other suitable manner. The arms 103 and 104 are arranged to be shorted by a plate 105. This plate is mounted on pivoted levers 106 which are respectively arranged to be operated by the pivoted levers 107. These levers are all pivoted to a non-rotatable block 108 into which is threaded the screw shaft 101, while trips 109 are arranged to operate the levers 107 at the proper time. As the load rises, the block 108 is forced to the right by the drum shaft, and the levers 107, and thus also the levers 106, are operated by the respective trips 109 against the centering springs 110, thus moving the plate 105 away from the arms 103 and 104 until the trip 109 is passed. When the trip is passed the plate 105 will fly to the right and short the arms 103 and 104. Coils 35 and 36 will thus be shorted, and the respective springs 92 and 93 will pull the switches 61 and 57 back to the respective plates 60 and 58, as shown in Fig. 1. The armature will then be shorted, as follows: Current will flow from the main lead 16, through switch 17, wire 18, switch 45, wire 91, plate 28, wire 7, wire 32, brake 33, field coil 34, point 74, coil 35, and then around the armature through the wire 55, switch 57, wire 59, switch 61, wire 63, plate 76, wire 23, overload circuit breaker coil 43, switch 22, to the main 15. This will bring the motor to rest. Also the current will then flow through coils 35 and 36 in the opposite directions, as follows: From the point 74 the current will flow directly through coil 35 without change in direction; but it will also flow through wire 96, the limit switch and wire 97, through coil 36 in the opposite direction; hence the adjacent ends of the cores 80 and 81 will have like polarity and will be repelled, holding the switches 61 and 57 in position as shown in Fig. 1.

The motor will then be stopped not only because its armature receives substantially no current, but, as soon as the switches 61 and 57 are shifted, a dynamic brake will be set up in the armature circuit which is now closed, independent of the main circuit, through the above described shorting circuit, as the field coil will be still fully energized, as is shown by the "stopping" circuit of Fig. 4.

It will be seen, however, that closing of the limit switch, and shifting the switches 57 and 61, in no way interferes with lowering the elevator carrier. The operator has only to throw the controller back to neutral, and then to the lowering position, and the normal lowering circuit will be formed, it being then immaterial whether or not the limit switch 100 is shorted, as the springs 92 and 93, and the unlike adjacent poles of the cores 80 and 81, will hold the switches 61 and 57 in the lowering position. However, a material current will flow through the shorting wires 96 and 97 and the limit switch 100, and to avoid sparking when this circuit is opened as the load descends, the trip 109 is arranged, as shown, to make a quick opening of the switch as well as a quick closing.

It is to be understood that this limit switch may be used in conjunction with any other form of limit switch, such as the common form of switch 70, which is supported by the arm 86 in the path of motion of the pin 72 fixed to the carrier 71; so that when the pin strikes the switch it will be closed and the motor armature will be shorted by the wires 87 and 88, which take the place of the wire 59. These switches may be arranged to act simultaneously or successively; but, as in case of either switch the armature is shorted, it is to be understood that if either limit switch operates, the motor will be stopped. Although closing of switch 70 will not operate switches 61 and 57, as the current is not then reversed through coil 36, yet the dynamic brake of the motor will be effective through the shorting circuit which is closed on the armature.

I claim as my invention:

1. In an elevating system, operating means, a limit switch comprising a slidably mounted member operatively connected with said operating means, a lever pivoted to said member, a trip fixed in position in the path of motion of one end of said lever, two electric switch arms fixed in position, a metallic plate mounted on said member and arranged to be operated by said lever, both of said arms being in the path of motion of said plate, and resilient means tending to hold said lever in normal position.

2. In an elevating system an electric limit switch comprising fixed terminals to be shorted, a piece arranged to be moved toward said terminals, a member to short said terminals movably mounted on said piece, means for moving said member with relation to said piece away from said terminals as said piece approaches said terminals, and means for then bringing said member quickly back to its normal position with relation to said piece when said piece is adjacent said terminals.

In testimony whereof I hereunto set my hand.

EDWARD P. COLLINS.